Oct. 7, 1958  J. M. GOLDEN  2,855,225
PLURAL-SWIVEL ELECTRICAL FIXTURE JOINT WITH
CHANNEL-SHAPED CABLE PASSAGEWAY
Filed Jan. 31, 1956
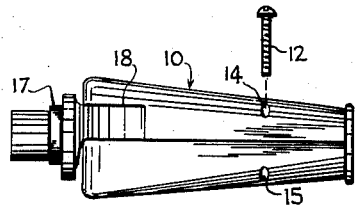
Fig. 1.
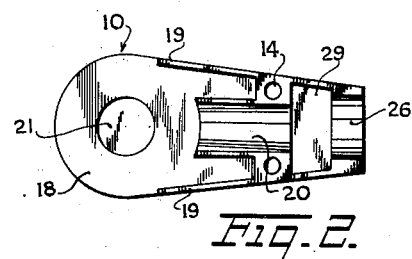
Fig. 2.
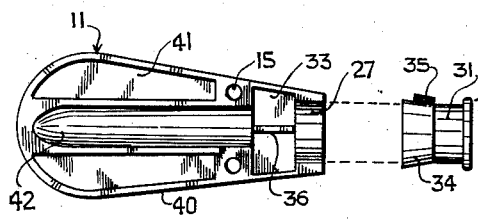
Fig. 3.
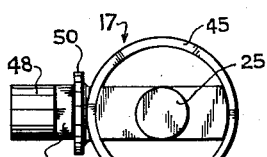
Fig. 4.
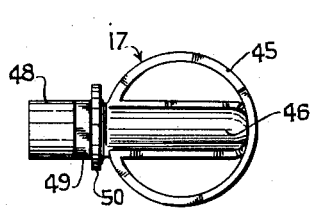
Fig. 5.
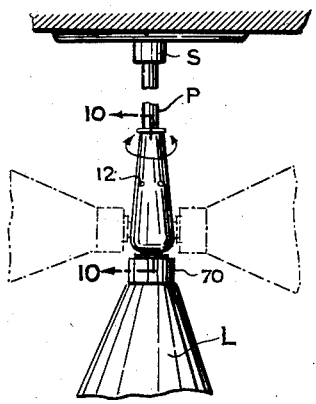
Fig. 9.
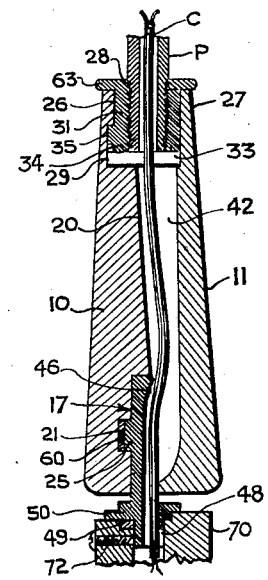
Fig. 10
Fig. 8.
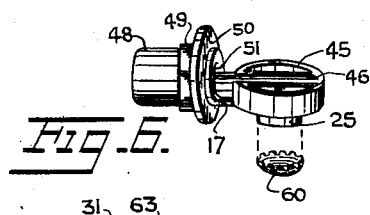
Fig. 6.
Fig. 7.
INVENTOR.
JACOB M. GOLDEN
BY
ATTORNEY

United States Patent Office

2,855,225
Patented Oct. 7, 1958

2,855,225

PLURAL-SWIVEL ELECTRICAL FIXTURE JOINT WITH CHANNEL-SHAPED CABLE PASSAGEWAY

Jacob M. Golden, Brooklyn, N. Y., assignor to Institute To Better Lighting, Inc., New York, N. Y., a domestic corporation Application January 31, 1956, Serial No. 562,398

2 Claims. (Cl. 285—168)

The present invention relates to the art of swivel joints for electric lamps and particularly concerns a novel structure for accomplishing movement of a supported fixture on two mutually perpendicular axes.

It is a principal object of the invention to provide a swivel joint capable of 180° of rotation on a transverse axis and substantially 360° of rotation on a longitudinal axis.

It is a further object to provide a tubular casing through which an electric wire may be passed without interfering with movement of associated swiveling parts.

It is a further object to provide a swivel joint for electric fixtures which is neat and attractive in appearance and which wholly conceals an electric wire therein.

It is a further object to provide a swivel joint of simplified structure which is adapted to economical mass production manufacturing methods.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a side elevational view of a joint structure embodying the invention.

Fig. 2 is a plan view of one half of the joint casing.

Fig. 3 is a plan view of another mating half of the joint casing.

Fig. 4 is a plan view of a swivel member, showing one side thereof.

Fig. 5 is a plan view corresponding to Fig. 4 showing the opposite side thereof.

Fig. 6 is a perspective view of the swivel member of Figs. 4 and 5.

Fig. 7 is a perspective view of another swivel member used in the joint assembly.

Fig. 8 is a plan view of a washer used with the swivel member of Figs. 4–6.

Fig. 9 shows the swivel joint embodying the invention supporting an electric lamp.

Fig. 10 is an enlarged sectional view taken on lines 10—10 of Fig. 9.

The swivel joint according to the invention includes an elongated body having two mating members 10, 11 as shown in Figs. 1, 2 and 3. Each member has a rounded end and tapering body. The members are secured together by a pair of screws 12 which pass through the screw holes 14 in member 10 to the threaded holes 15 in member 11. One screw 12 is shown for this purpose in Fig. 1.

Body member 10 is shaped to support the swivel member 17 on a bearing surface of a recess 18 which is generally circular in form. The recess is disposed at the end of the body member and extends from the rounded end of member 10 to the upstanding side walls 19 and central channel 20. A circular recess 21 is disposed in the base of recess 18 and is intended to serve as a bearing for the circular boss 25 of the swivel member 17 as shown in Fig. 4. At the narrow end of the body member 10 is a semicylindrical groove 26 which cooperates with a corresponding groove 27 in member 11 to provide a sleeve bearing opening for the cylindrical portion 31 of swivel or pivot member 28. A tapered groove 29 adjoins groove 26 and mates with groove 33 in member 11 to encircle the free end 34 of member 28. A nib or key 35 is disposed on the free end 34 and is intended to engage the ridge 36 located in groove 33, so that the swivel member 28 rotates on a longitudinal axis substantially but not more than 360 angular degrees. This arrangement is intended to prevent breakage of the electric wire or cable C which passes through the swivel member 28 as shown in Fig. 10.

Body member 11 has a rounded end and tapering shape corresponding to and mating with body member 10. The sides 40 of the body member are not cut short as are the sides 19 in member 10. These sides as well as the central groove section 42 have flat ends which serve as a seat for the abutting ring 45 of swivel member 17, during swiveling movements thereof on a transverse axis. The groove section 42 has a central channel so located that the cable C may be disposed therein and pass to an overlapping channeled plate 46 in swivel member 17, in all positions thereof. Spaces or recesses 41 are provided in the fitting section to lighten the member and economize in the use of metal, but if desired they may be filled in.

Swivel member 17 is a disc-like structure and has a circular ring portion 45 in which is centrally disposed the channel plate 46 shown best in Fig. 5. On the reverse flat side of the channel plate is the circular boss 25 which seats and journals in recess 21 of body member 10. The channel plate continues into the cylindrical fitting section or nipple 48 which includes a square section 49 and flange 50. Passage 51 as shown in Fig. 6 is the continuation of the groove 46.

In Fig. 8 is shown a dished spring washer 60 which has a serrated rim 61. This washer fits into the recess 21 beneath boss 25 so that when the body members are secured together swivel member 17 may be moved with respect to the body members but will remain fixed in position wherever set.

In Fig. 7 is shown the swivel member 28. This has a hollow cylindrical body 31 which is threaded internally as shown by the thread 62. The free end of the body has a flange 63. The hollow cylindrical body 31 may also be externally threaded.

In Figs. 9 and 10 is shown a completely assembled swivel joint with a lamp or other fixture supported thereon. A lamp L has a collar 70 into which is inserted the cylindrical section 48 of the swivel member. A set screw 72 passes through the collar and retains the section 48. The square section 49 fits into a correspondingly shaped recess in the collar and prevents rotational movement of the swivel member with respect to the collar. Flange 50 abuts the top of the collar 70. Boss 25 of the swivel member is inserted in recess 21 in which is the detent washer 60. Body members 10 and 11 are secured together by the screws 12 and provide a passage for the cable C. This passage consists in part of the facing channel sections 20 and 42 at the upper end of the passage. The lower section of channel plate 42 faces channel plate 46 at the lower end of the passage. It is possible by this arrangement to pivot or swivel the fixture L through 180 angular degrees as shown by dotted lines in Fig. 9 without exposing the wire or injuring it. It will be noted that the lower end of channel 42 and the upper end of channel plate 46 are both smoothly tapered toward each other. This prevents cutting of the cable as the fixture is pivoted on the swivel joint.

The hollow post P attached to a support S has a threaded end which is screwed into the upper swivel member 28. Flange 63 abuts the upper end of the body members 10 and 11. The body members are turnable with respect to the member 28 since the cylindrical bearing section 31 journals in the mating grooves 26, 27. Key 35 moves freely in grooves 29 and 33 until it is stopped by ridge 36 at either extreme of clockwise and counterclockwise motion. Cable C passes through the post P into the passage defined by channels 20 and 42.

The arrangement described is accomplished with a minimum of moving parts. Each pivotal movement is accomplished without injury or restraint by the electric wire passing through the joint. The assembly is neat and attractive in appearance and shows no unsightly slots or gaps. The joint is readily assembled with only a screwdriver being required. The joint may be fabricated from metal or plastic parts. All movements of the fixture L are frictionally restrained. Thus in the horizontal positions assumed by the fixture as shown in Fig. 9, the force exerted by the spring washer 60 insures that the fixture will remain in the set position until manually moved to another position.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A swivel joint for an electric fixture comprising an elongated tapered tubular sectional body having a circular opening at its narrower end and a slotted opening at its opposite end, said body being composed of a pair of mating sections, one of said mating sections having a circular recess in its inner surface at the slotted end of the body the other mating section having an inner groove extending longitudinally through the center thereof, means for fastening said sections together, a tubular connector member swivelly mounted in the narrower circular end of the body, a tubular connector member hingedly mounted in the slotted end of the body, said latter tubular connector comprising a tubular body portion having a channeled plate member extending from one end thereof with a ring member encompassing said plate member, said plate member and ring being pivotally mounted in said slotted end the channel in said plate member facing the inner groove in said other mating section, a boss carried by said plate member and being seated in the recess in said one mating section for interlocking the latter connector member with the body, and a flange on the latter connector between the tubular body portion thereof and the extending plate member for engagement with the end of a lighting fixture, and means for holding the hinged tubular connector in adjusted position including a spring washer fitted in said recess having a serrated rim coacting with the wall of the recess.

2. A swivel joint for an electric fixture comprising an elongated tapered tubular sectional body having a circular opening at its narrower end and a slotted opening at its opposite end, said body being composed of a pair of mating sections, one of said mating sections having a circular recess in its inner surface at the slotted end of the body the other mating section having an inner groove extending longitudinally through the center thereof, means for fastening said sections together, a tubular connector member swivelly mounted in the narrower circular end of the body, means for limiting the swiveling movement of said tubular connector member, a tubular connector member hingedly mounted in the slotted end of the body, said latter tubular connector comprising a tubular body portion having a channeled plate member extending from one end thereof with a ring member encompassing said plate member, said plate member and ring member being pivotally mounted in said slotted end the channel in said plate member facing the inner groove in said other mating section, a boss carried by said plate member and being seated in the recess in said one mating section for interlocking the latter connector member with the body, and a flange on the latter connector between the tubular body portion thereof and the extending plate member for engagement with the end of a lighting fixture, and means for holding the hinged tubular connector in adjusted position including a spring washer fitted in said recess having a serrated rim coacting with the wall of recess, said means for limiting the swiveling movement of the swivel tubular connector member being a key on said swivel tubular connector member and a ridge on the inner surface of one of said mating sections in the path of movement of said key.

References Cited in the file of this patent

UNITED STATES PATENTS

| | | |
|---|---|---|
| 994,904 | Brown | June 13, 1911 |
| 2,217,407 | Hansen | Oct. 8, 1940 |
| 2,242,899 | Armbruster | May 20, 1951 |
| 2,617,619 | Versen | Nov. 11, 1952 |
| 2,694,585 | Fiori | Nov. 16, 1954 |
| 2,709,097 | Leary | May 24, 1955 |